United States Patent [19]

Kim

[11] Patent Number: 5,768,702
[45] Date of Patent: Jun. 23, 1998

[54] UPPER-EXTREMITY DIRECT POWER-INPUT DEVICE FOR BICYCLISTS

[76] Inventor: Sinil Kim, 548 Ford Ave., Solana Beach, Calif. 92075

[21] Appl. No.: 565,066

[22] Filed: Nov. 30, 1995

Related U.S. Application Data

[63] Continuation-in-part of Ser. No. 214,228, Mar. 17, 1994, abandoned.
[51] Int. Cl.$^6$ .................................................. A41D 13/00
[52] U.S. Cl. .................................. 2/1; 2/312; 2/62; 2/24; 280/230; 280/290; 482/48
[58] Field of Search ................................. 2/1, 22–24, 62, 2/231–233, 242, 338, 267, 311, 312, 313, 317, 330, 331; 280/230, 290; 482/91, 48

[56] References Cited

U.S. PATENT DOCUMENTS

| | | | |
|---|---|---|---|
| 926,328 | 6/1909 | Horath et al. | 2/24 |
| 4,484,361 | 11/1984 | Leighton et al. | 2/24 |
| 4,796,303 | 1/1989 | Atwater | 2/24 |
| 5,417,647 | 5/1995 | Down | 2/24 |

*Primary Examiner*—Gloria M. Hale

[57] ABSTRACT

The invention is a bicycling device and method of use thereof, whereby muscle power can be more efficiently transferred from the cyclist's upper-extremities (arms) to the conventional footpedals via the cyclist's lower-extremities (legs) without need of mechanical contrivance and associated drain on fractional human-power capability. The device is attached proximally to the knee region as a method by which a cyclist may obtain a firm manual handhold, whereby the cyclist can grasp the device with his hand and proceed to exert appropriate downward-thrust or upward-thrust (during up-stroke using shoe/pedal-cleats) supplied from upper-extremities according to the regular cyclic rotation of the associated footpedal. Since upper extremity thrusting is applied directly through mechanism of the cyclist's own lower extremities, the need for manufactured mechanical contrivance and its associated weight penalty has been averted. Hence, the cyclist can combine additional power from the upper extremities instantly as needed, while realizing the benefit of exercising muscles in all four extremities as well as in torso. The device may be made integral with the cyclist's apparel or otherwise secured via leg-associated locative constrainments, whereby the device is basically a component of the cyclist's personal gear, not of the bicycle.

20 Claims, 1 Drawing Sheet

UPPER-EXTREMITY DIRECT POWER-INPUT DEVICE FOR BICYCLISTS

DESCRIPTION OF RELATED APPLICATIONS

This application is a continuation-in-part application of U.S. patent application Ser. No. 08/214,228, filed March 17, 1994, now abandoned.

FIELD OF INVENTION

This invention relates to apparatus and methods thereof enabling a bicyclist to employ at least partial upper-body muscle-power in addition to existing lower-body muscle-powering means, via conventional footpedal apparatus. And in particular, means which convey the upper-body power to the foot-pedals directly via the cyclist's lower-extremities; and including means of alternately pushing the descending-leg, as well as lifting the opposite ascending-eg, toward imparting greater propulsion effort into the footpedals.

DESCRIPTION OF THE PRIOR-ART INVENTIONS

In contrast to methods of attaining whole-body exercise, such as swimming, the rider of a bicycle is generally receiving comparatively less than total benefit of upper-body musculature. This is owing to less than optimal usage of the upper-extremities (that is to say, the "arms" per se, versus the lower-extremities, or "legs"). The advent of shoe/pedal-cleats as devices by which the avid cyclist can alternately exert both downward and upward force upon the foot-pedals, for nearly 360-degrees of leg-power input, has actually tended to even further exacerbate this power-input disparity between the cyclist's upper and lower extremities.

Heretofore, a plethora of inventions have explored the notion of attaining a more balanced degree of ergonomic input interface (that is interconnection or interaction) between the body's upper and lower extremities; however, most of them suffer from misconceptions as to practicality, safety, or weight considerations. Chronologically for example, German Pat. #81,199 (filed: 11/1894) on a "drive-mechanism for bicycles, is operated by levers engaged by the rider's thighs", whereby its inventor set forth a pair of vertical-levers which are mechanically coupled down to the foot-pedals. Both levers have a transversely opposing arched upper-thigh engaging padded drawbar, which act to convey lifting effort of the respective leg-muscle toward achieving a more continuous circular occurrence of power input. However, no application of upper-extremity effort is realized. In the big front-wheeled bicycles of the late 19th century, the front-wheel could be powered by either foot-pedals or hand-cranks as shown in U.S. Pat. No. 314,335; which a bit later in U.S. Pat. No. 484,712, hand-cranks are employed to drive the rear-wheel in a bicycle configuration of a more conventional upright design.

In U.S. Pat. No. 579,002 (filed: 9/1897), a shoulder-harness is shown having a Y-shaped vertical strap descending down the cyclist's back to be positively attached to the rear of the cyclist's seat. The seat being supported upon a vertical crankarm liked to the footpedal assembly, thereby said enable the cyclist to ostensibly apply a bit of upper-body (torso) weight down toward propulsion of the bicycle.

In Belgium Pat. #398,350 (filed: 8/1933) a pair of leg-straps are joined around the cyclist's aft-waist region and separately down the thighs (avoiding the kneecap), and down to their ankles, where the lower distal ends of each strap are secured to a special secondary crossbar arranged slightly above and to the footpedal. This technique was an early attempt to enable upward effort upon the footpedals as well, but did not convey effort from the upper-extremities.

In French Pat. #896,837 (filed: 7/1943) a pair of independent strap-on leverarms are shown extending just forward of the knee, with a link interconnecting the forward tip of both leverarms down to their respective footpedal-axis, thereby enabling the cyclist's thigh to exert a lifting tension in addition to normal compression effort upon the footpedal. However, the device does not serve to convey power from the upper-extremities.

In U.S. Pat. No. 3,727,608 (filed: 4/1973) a body-massaging action is achieved via a foot-powered pedaling apparatus, including an inverted U-shaped frame supporting a bicycle type seat at the rear-end, and a pair of handlebars at the forward-end just above the footpedals. An eccentric crankpin is included with the footpedals, to which is attached a pulley-cord so as to remotely oscillate a massaging-belt secured about the cyclist's abdomen. Again, there is no contemplation of conveying upper-extremity power impetus.

In U.S. Pat. No. 4,685,692 (filed: 8/1987) is shown a combination footpedal and articulated-handlebar propelled bicycle. The laterally opposed handlebar-grips are cranked in unison to turn a rotaryshaft-drive gear to the footpedal's crankshaft. The notion of an articulated-handle bar mechanism to convey power from the upper-extremities is, however, rather ungainly and cumbersome in weight; thus, such mechanism has never attained popular acceptance in the marketplace.

In U.S. Pat. No. 5,137,501 (filed: 7/1988) is shown a stationary gym exercising-bike having a framework supporting a seat fixed above a pair of footpedals, including a chain-driven flywheel linked to a pair of fore/aft acting handlebars actuated by the upper-extremities. As the arms and legs power the flywheel, a plurality of evenly spaced pulse-generating devices affixed to the flywheel serve to impart the cyclist's exercising cadence to an electronic-control unit, determining the rhythmic beat of accompanying music. There is little relevance here however, since the arms and legs are not directly interacting.

In Italian Pat. #337,955 (filed: 9/1989) is shown a stationary gym exercising-bike having a footpedal with chain-driven flywheel with eccentric-pins to which is coupled a pulley arrangement to cause an abdomen massage-belt to oscillate transversely across the cyclist's frontal region. Again, there was shown no contemplation of imparting added power from the body's upper-extremities.

Therefore, in full consideration of the preceding patent review, there is determined a need for further improvement in the form of upper-extremity input means to which some of these prior-art inventions have been addressed. The instant inventor hereof believes that his improved ergonomic input apparatus exhibits certain advantages as shall be revealed in the subsequent portion of this instant disclosure.

SUMMARY OF THE INVENTION

The primary objective of this invention is to essentially set forth a practical, inexpensive, light-weight apparatus and method thereof, capable of reliably directly interfacing a cyclist's upper-extremities composed of entire right and/or left arms with his/her lower-extremities, comprised of entire right and/or left legs, without employment of elaborate mechanism in ultimately translating these separate bodily power sources to the footpedals.

Another object of this invention is to create an absence of power-robbing friction inducing mechanisms, which is known to be a crucial factor in the attainment of peak efficiency where the fractional power-output of human ergonomics is involved. A method for its use with an existing conventional bicycle is employed, whereby the cyclist exerts upper-extremity muscle power directly into the footpedals by way of the lower-extremities. This unique direct interfacing virtually eliminates normal frictional loss from intervening mechanism.

Another object of this invention is to set forth a safe means by which to obtain combined power-input exercise to the footpedals from the musculature of both the upper and lower extremities. Other than optional use of conventional modern quick-release shoe or pedal cleats (for up-stroke input), the cyclist need only release his hand-grasp at the knee region comprising the knee-joint and the immediate thigh portion thereto in order to instantly free himself of physical connection of the upper extremities with the lower extremities.

Another object of this invention is to enable the competitive cyclist to increase their performance by simply grasping the knee region of their lower-extremity, either right-hand upon the right lower extremity, or left-hand upon the left lower extremity, whereby this procedure may be substituted upon occasion as the particular upper extremity becomes fatigued, or selectively engaged to ease the muscle or ligament stress upon a possible right or left lower extremity, for example, in leg-cramp condition.

Another object of this invention is to enable the cyclist user of stationary gym exercise bicycle, of the type the only exercises the lower-extremities, to now attain ideal simultaneous utilization of both the right and left upper extremities, since with static bicycles, there is in no need to safely maintain at least one hand upon the handlebar. This fitness embodiment of the invention thus attains a maximum of balanced cardiovascular stimulation, of ultimate benefit to the cyclist. (Note that hereinafter, other cycling apparatus, such as stationary exercise bicycles or cycling apparatus for powering light boats and airplanes, are to be broadly interpreted herein, for purpose of this disclosure, as a type of bicycle.)

DESCRIPTION OF THE PREFERRED EMBODIMENT DRAWINGS

The foregoing and still other objects of this invention will become fully apparent, along with various advantages and features of novelty residing in the present embodiments, from study of the following description of the generic variant species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature.

DETAILED DESCRIPTION OF THE PREFERRED EMBODIMENTS

Figure 1:
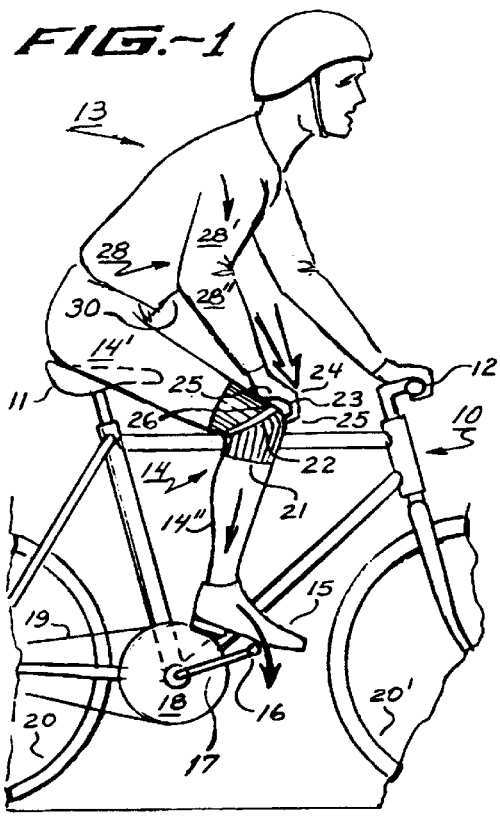
FIG. 1 is a partial side-elevation-view of the bicycle right side, showing how the cyclist applies upper-extremity compressive-force effort to a conventional uncleated footpedal Mile knee portion of his lower-extremity region during a down stroke.

Initial reference is given by way of FIG. 1 showing an entirely conventional bicycle-frame structure 10 having seat member 11 and handlebar 12 in support of typical cyclist 13, whose right lower-extremity 14 (including upper leg 14 and lower leg 14" ) is shown applying downstroke effort via foot 15 upon conventional uncleated footpedal 16 operating upon ordinary crankarm portion 17 having usual chainwheel 18 with endless drive-chain 19 ultimately powering drivewheel 20; while front wheel 20' only steers. Exhibited herewith is a practical, if basic, embodiment of the invention, in the form of a snug-fitting knee-cuff like appliance preferably having an expandable flexible sleevelet portion 21 including a knee region encircling non-resilient restraintstrap 22 to which is provided a hand-grip 23. This essentially constitutes a version of the invention which can be readily employed beneficially by most any bicyclist, from recreational cycling to working a neighborhood paper route on bicycle where there may be grades to ascend.

Note here in FIG. 1 how the cyclist's hand 24 is primarily employing the palm portion 25 of the hand, utilizing the fingers 25 essentially to maintain positioning of the hand's paln 25 compressively upon yoke-like push pad 26 secured to restraint strap 22. Observe also here how during a downstroke only, the simple invention enables a cyclist to enjoy exerting appropriately-timed power exercise impulses (see associated power-thrust vector ref. - arrows) from their upper-extremity 28 comprising the upper arm 28' and forearm 28"; along with assistance from the abdominal-muscle area 30. This power is thus efficiently applied cyclically upon the knee region via knee push pad 26, then resultantly directed through lower leg 14" of lower extremity into bicycle footpedal 16.

Figure 2:
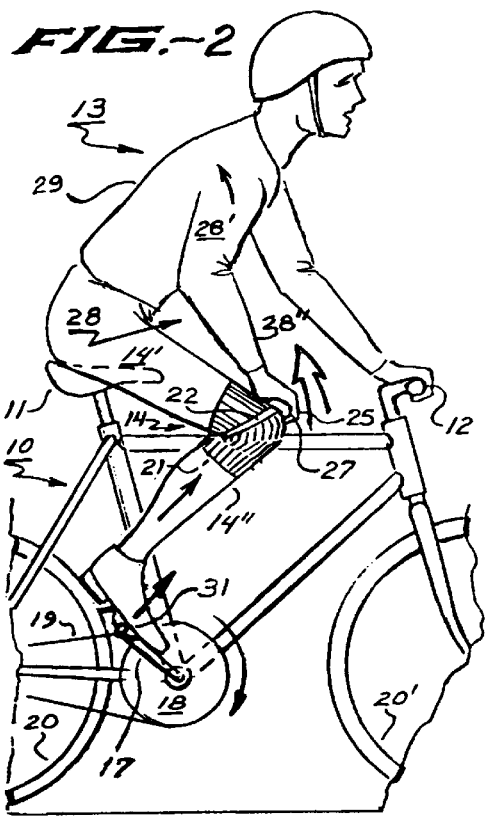
FIG. 2 is a like view thereof, showing how the cyclist can apply upper-extremity tensive effort to a conventional show/pedal-cleated footpedal via the knee portion of his lower extremity during an up stroke.

In FIG. 2, a generic variation of the FIG. 1 embodiment is set forth, wherein the primary difference is the provision of pull-handle portion 27 in addition to push-pad portion 26, enabling the cyclist to now effectively utilize their back-muscle group 29 as well as their upper extremity 28 in exerting oppositely timed cyclic tensive impulses (again, see associated power-thrust vector ref. - arrows). This tensive, pulling, effort is oppositely directed through the lower leg 14" of lower extremity as an upward pulling action, by provision of an optional conventional shoe/pedal-cleated device 31 or toeclip device, which are commercially available in various quick-release configurations of choice. Since the cyclist can now apply both compressive (during downstroke) and tensive (during upstroke) upper-extremity power impulses in an efficient manner directly in conduction with footpedal 16, excellent cardiovascular stimulation may be realized. Moreover, if the FIG. 2 example were a stationary exercise bicycle or other special bicycle with no requirement of maintaining one hand upon the handlebar 12 for steering safety, then complete right/left upper/lower quadruple extremities of the body may be utilized for optimal power output and cardiovascular stimulation activity.

Figure 3:
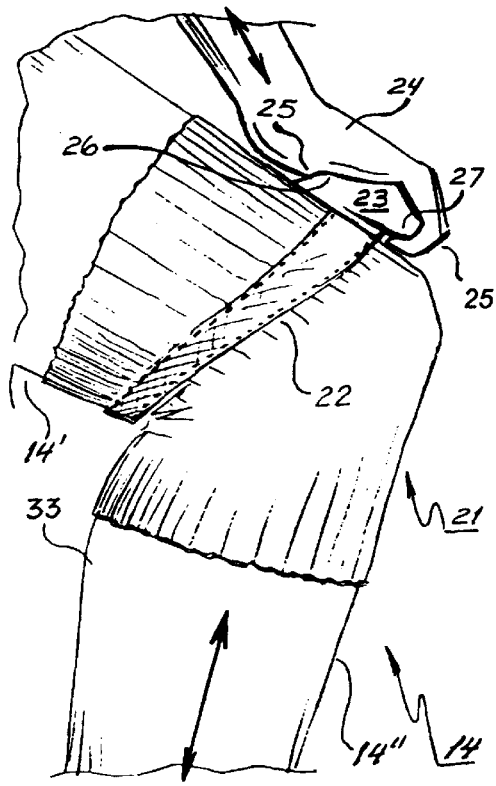
FIG. 3 is an enlarged partial side/elevation view detailing the knee region, showing an embodiment generic to FIGS. 1 and 2.

Reference to FIG. 3 shows an enlarge detail of a preferred embodiment of the invention appliance as fitted upon the cyclist's knee region, wherein it may be more clearly seen how the hand-hold portion of the appliance essentially serves to give the cyclist's hand 24 a more comfortable and positive bearing and holding relative to the knee region of the lower extremity. While the hand-hold device can take on still other variations as to particular configuration, it is desired that the appliance include a resilient snug-fitting sleevelet portion 21, supporting a slightly cushioned push-pad portion 26. Plus, a version includes a relatively rigid pull-grip portion 27, arranged proximally atop the knee region of the lower-extremity for easy grasping by the finger 25', thereby alternatingly facilitating both compressive and tensive load thrusts without the need for shift of hand position. Another generic-variant embodiment is to eliminate the palm-pad portion 26, and feature a finger pull-grip portion 27 only, for specialized applications where tensive upward component of thrust upon the footpedal during the upstroke only is desired.

Figure 4:
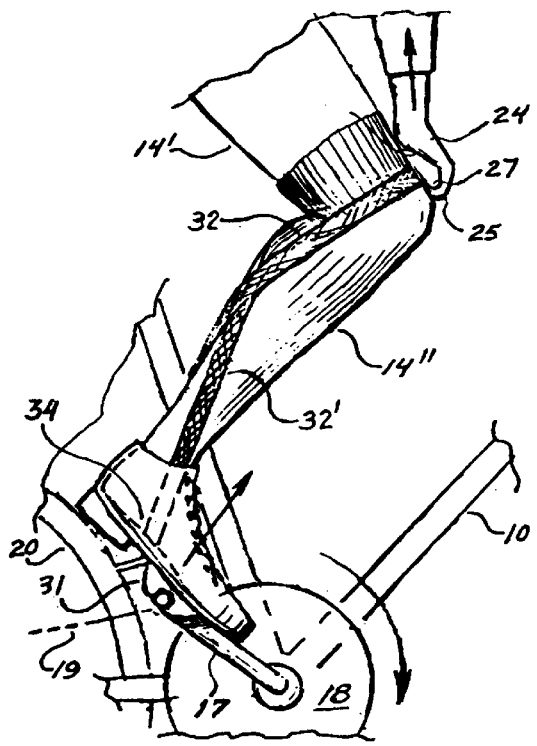
FIG. 4 is an enlarged partial side/elevation view of FIG. 2, although here showing a generic variant embodiment.

Study of FIG. 4 reveals a still more specialized generic-variant of the invention having a modified restraint-strap arrangement in the form of a leg-harness having two non-elastic tension straps 32/32 which preferably cross behind the calf of the lower leg, while descending oppositely in mirror image, finally terminating together proximally at the instep[]of the foot. This embodiment very comfortably and efficiently pulls up from the base region bf the foot, thereby relieving any tension to the underside of the thigh possibly imposed in FIG. 3 embodiment, thus making full use of the exemplified conventional cleated-shoe device 31. Note also, that both FIG. 3 and FIG. 4 embodiments may be optionally integrated into the cyclist's leggings or cycling pants as well.

Finally, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, as defined as follows.

I claim:

1. A method for use of a bicycle, whereby its cyclist can exert upper-extremity musclepower upon the footpedals via the lower extremities without frictional loss from intervening mechanism, the method comprising:
   a) application of a hand-hold device upon the right knee of said cyclist and/or left knee region of said cyclist
   b) grasping of said knee region fast while exerting an appropriately timed downward and/or appropriately timed upward force thereupon said knee;
   c) repetitive operation of said application, grasping, and exerting of upper-extremity muscle-power to achieve cycling propulsive thrust.

2. An apparatus for use with a bicycle, whereby its cyclist can exert upper-extremity muscle-power upon the footpedals via the lower extremity, thereby obviating frictional loss from intervening mechanism, the apparatus comprising:
   a) provision of right and/or left hand-hold means facilitating application of the right hand upon the right knee region and/or application of the left-hand upon the left knee region;
   b) grasping of said knee region fast while exerting an appropriately timed force means thereupon said knee region; upper-extremity
   c) repetitive operation of said application, grasping, and exerting of upper-extremity muscle-power to achieve cycling propulsive thrust.

3. The apparatus according to claim 2, wherein said appropriately timed upperextremity force means is a compressive load imposing a downward component of thrust upon the footpedal via the cyclist's lower extremity during the downstroke.

4. The apparatus according to claim 2, wherein said appropriately timed upper-extremity force means is a tensive load imposing an upward component of thrust upon the footpedal via the cyclist's lower-extremity during the upstroke.

5. The apparatus according to claim 2, wherein said hand-hold is a manner of palm push-pad arranged proximally atop the knee region of the lower extremity.

6. The apparatus according to claim 2, wherein said hand-hold is a of pull-grip arranged proximally atop the knee region of the lower extremity.

7. The apparatus according to claim 6, wherein said pull-grip forms the forward portion of the hand-hold which includes an aftward push-pad portion, thereby facilitating both tensive and compressive load thrusts.

8. The apparatus according to claim 2, wherein said hand-hold means includes a snug-fitting sleevelet encircling the circumference of the knee region.

9. The apparatus according to claim 8, wherein the said sleevelet includes a restraint-strap member encircling circumference of knee region thereby transferring said upper-extremity muscle-power to footpedal.

10. The apparatus according to claim 8 or 9, wherein the said sleevelet is a part of the said cycling pants or leggings worn by said cyclist.

11. The apparatus according to claim 6, wherein said pull-grip includes a leg-harness having straps which descend along the calf of the leg, of said cyclist and terminate at the foot, thereby comfortably pulling up from instep of cyclist's said foot.

12. An apparatus for use by a cyclist upon a bicycle or pedaled exerciser, enabling the cyclist's upper-extremity muscle-power to be directed upon the footpedals via the cyclist's lower-extremity, thereby obviating frictional loss of intervening mechanism; said apparatus comprising:
   right and/or a left hand-hold means facilitating application of the right-hand upon the right-knee region, and/or application of the left-hand upon the left-knee region, including a leg-harness means serving to locate said hand-hold means securely at said knee region, whilest said cyclist grasps fast of said hand-hold means to exert an appropriately timed upper-extremity pushing or pulling muscle force for added propulsive thrust.

13. The cycling apparatus according to claim 12, wherein said leg-harness includes a pair of non-elastic straps which wrap over atop the cyclist's knee and distend down in a cross-over arrangement along the calf of the lower extremity and terminate under the instep of the cyclist's foot, thereby comfortably pulling upward in tension from said foot.

14. The cycling apparatus according to claim 12, wherein said appropriately timed upper-extremity muscle force is a compressive load imposing a downward component of thrust upon the footpedal via the cyclist's lower-extremity during the downstroke.

15. The cycling apparatus according to claim 12, wherein said appropriately timed upper-extremity muscle force is a tensive load imposing an upward component of thrust upon the footpedal via the cyclist's lower-extremity during the upstroke.

16. The cycling apparatus according to claim 12, wherein said hand-hold is a palm push-pad arranged proximally atop the knee region of the lower extremity.

17. The cycling apparatus according to claim 12, wherein said hand-hold is a pull-grip arranged proximally atop the knee region of the lower extremity.

18. The cycling apparatus according to claim 16, wherein said pull-grip forms the forward portion of said hand-hold which includes an aftward push-pad portion, thereby facilitating both tensive and compressive load thrusts.

19. The cycling apparatus according to claim 11, wherein said leg-harness is Integrated with cycling pants or leggings worn by said cyclist.

20. The cycling apparatus according to claim 13, wherein said leg-harness is integrated with cycling pants or leggings worn by said cyclist.

\* \* \* \* \*

UNITED STATES PATENT AND TRADEMARK OFFICE
CERTIFICATE OF CORRECTION

PATENT NO. : 5,768,702
DATED : June 23, 1998
INVENTOR(S) : Sinil Kim

It is certified that error appears in the above-identified patent and that said Letters Patent is hereby corrected as shown below:

Col. 1, line 18, change "eg" to --leg--.

Col. 1, line 60, change "liked" to --linked--.

Col. 3, line 29, change "the only" to --that only--.

Col. 3, line 59, change "Mile" to --via the--.

Col. 3, line 62, change "show" to --shoe--.

Col. 4, line 9, change " leg 14 " to -- leg 14' --.

Col. 4, line 26, change " 25 " to -- 25' --.

Col. 4, line 27, change "paln" to --palm--.

Col. 5, line 18, change " 32/32 " to --32/32' --.

Col. 5, line 21, change " ☐ " to --34--.

Col. 6, line 6 and 7, change "appropriately timed force means thereupon said knee region; upper-extremity" to --appropriately timed upper-extremity force means thereupon said knee region;--.

UNITED STATES PATENT AND TRADEMARK OFFICE
CERTIFICATE OF CORRECTION

PATENT NO. : 5,768,702
DATED : June 23, 1998
INVENTOR(S) : Sinil Kim

It is certified that error appears in the above-identified patent and that said Letters Patent is hereby corrected as shown below:

Col. 6, line 12, change "upperextremity" to --upper-extremity--.

Col. 6, line 25, change "a of pull-grip" to --a pull-grip--.

Signed and Sealed this

Twenty-seventh Day of April, 1999

Attest:

Q. TODD DICKINSON

*Attesting Officer*    *Acting Commissioner of Patents and Trademarks*